United States Patent [19]
Okamura et al.

[11] Patent Number: 5,233,481
[45] Date of Patent: Aug. 3, 1993

[54] MAGNETIC RECORDING AND REPRODUCING APPARATUS

[75] Inventors: Hiroshi Okamura; Koji Osafune, both of Tokyo, Japan

[73] Assignee: Kabushiki Kaisha Toshiba, Kawasaki, Japan

[21] Appl. No.: 633,939

[22] Filed: Dec. 26, 1990

[30] Foreign Application Priority Data

Dec. 28, 1989 [JP] Japan .................................. 1-338413

[51] Int. Cl.$^5$ ............................................... G11B 5/09
[52] U.S. Cl. ......................................... 360/45; 360/51
[58] Field of Search ....................... 360/45, 46, 51, 48

[56] References Cited

U.S. PATENT DOCUMENTS

| | | | |
|---|---|---|---|
| 4,845,575 | 7/1989 | Wahler | 360/51 |
| 4,845,576 | 7/1989 | Kusunoki et al. | 360/67 |
| 5,036,408 | 7/1991 | Leis et al. | 360/48 |

OTHER PUBLICATIONS

Imamura et al., "Barium Ferrite Perpendicular Recording Floppy Disk", Toshiba Review, No. 154, pp. 18–22, Winter 1985.

Steve Brittenham, "Time Domain Characterization of Thin Film Head/Media Systems", IEEE Transactions on Magnetics, vol. 24, No. 6, Nov. 1988.

*Primary Examiner*—Vincent P. Canney
*Attorney, Agent, or Firm*—Finnegan, Henderson, Farabow, Garrett & Dunner

[57] ABSTRACT

To prevent a decrease in the window margin due to reproduced signals having asymmetrical waveforms in a magnetic recording and reproducing apparatus, data in which peak shifts occur are recorded in the SYNC regions in the data format for the recording medium in accordance with the recording method. In data read operation, by detecting the data recorded in the SYNC regions, the center of the data window signal is shifted by a desired peak shift amount.

7 Claims, 8 Drawing Sheets

| a | b | c | VFO CIRCUIT GAIN |
|---|---|---|---|
| L | X | X | FREE RUN |
| H | L | X | HIGH |
| H | H | L | MIDDLE |
| H | H | H | LOW |

( X : UNDEFINED )

FIG. 14

MAGNETIC RECORDING AND REPRODUCING APPARATUS

BACKGROUND OF THE INVENTION

Field of the Invention

This invention relates to a magnetic recording and reproducing apparatus.

Description of the Related Art

Commonly-used floppy disk apparatuses record and reproduce data in and from the recording medium by the MFM (Modified Frequency Modulation) recording method. In this MFM method, clock pulse signals are inserted in a series of data pulse signals according to the data recording condition. Therefore, data window signals are required to separate the data pulse signals and the clock pulse signals in the signals reproduced from the recording medium and to detect the desired signal in proper timing. To produce data window signals and separate the data pulse signals and the clock pulse signals in the reproduced signal as required, a data separator (also known as a VFO (Variable Frequency Oscillator) circuit) is used.

Figure 1:
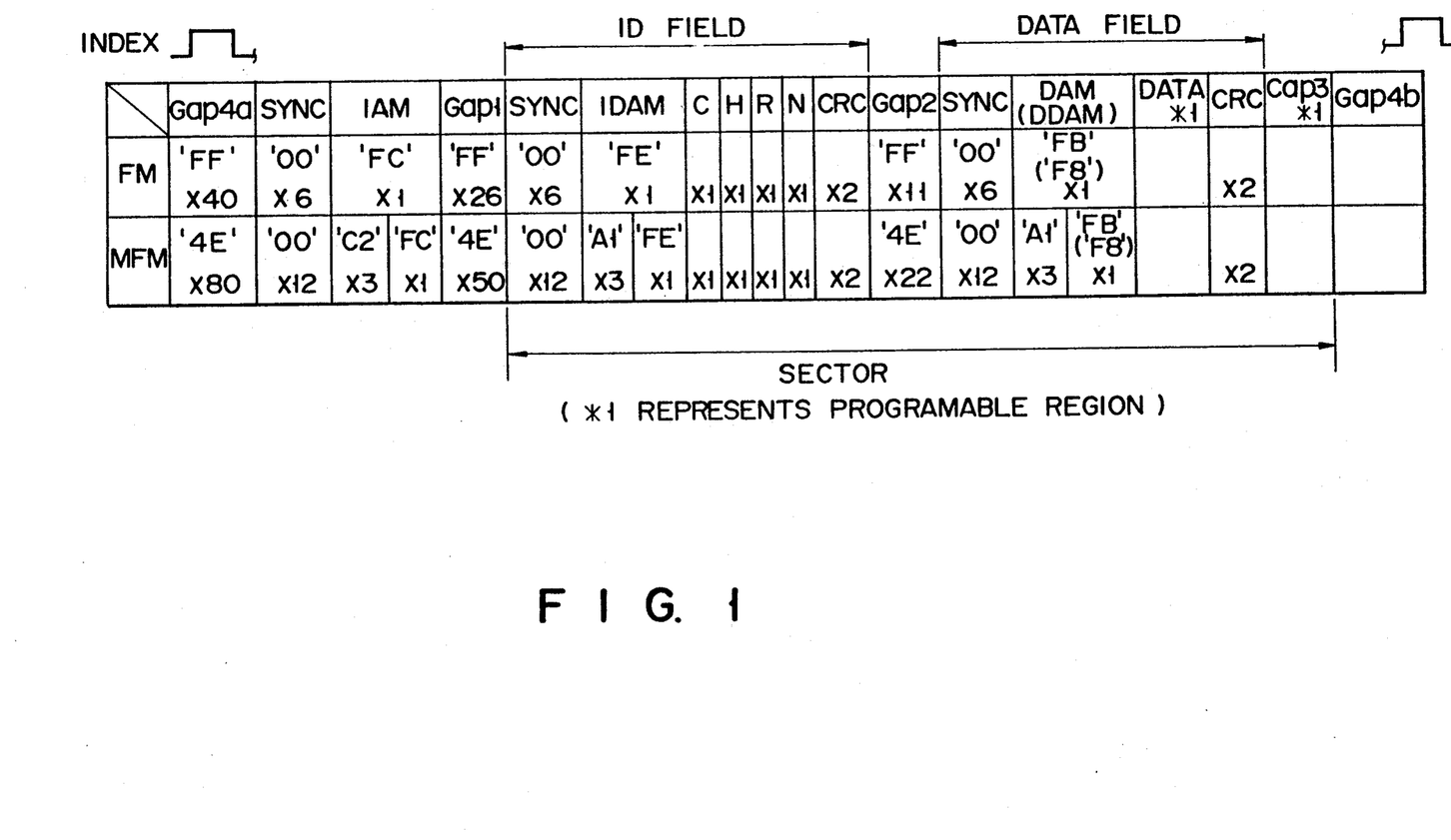
FIG. 1 illustrates the data format of a floppy disk.

With the data format of the floppy disk shown in FIG. 1, "00" (hereinafter, a hexadecimal number is identified by the symbol (H)) data is represented by a series of clock pulse signals, and based on this "00" (H) data, the data separator produces data window signals.

Specifically, in the data format of the floppy disk, a SYNC region is assigned to the head of each of the ID and data fields, and "00" (H) data is continuously recorded in the SYNC region. When a signal detection for the SYNC region is performed, a pulse series including only clock pulse signals with the same pulse interval is obtained. As a result, each clock pulse signal is affected by the preceding and the following clock pulse signals to the same extent, and no peak shift occurs. Therefore, by synchronizing operation timing of the data separator with the pulse series of the clock pulse signals detected at the SYNC region, the data separator locks in immediately, thereby producing accurate data window signals.

Figure 2:
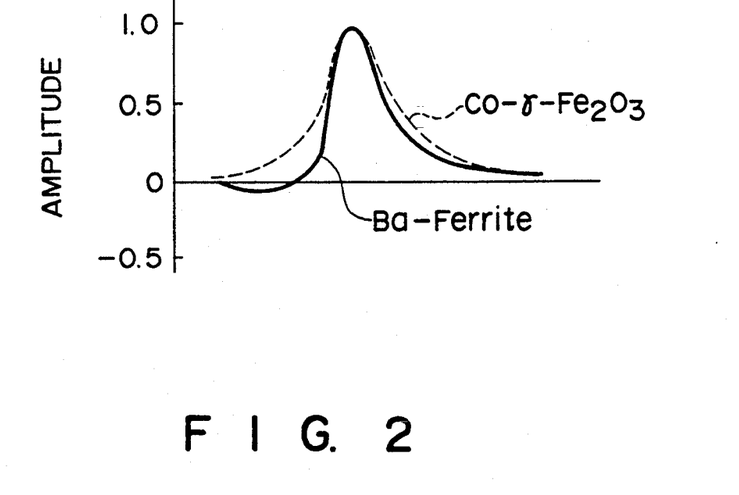
FIG. 2 shows the signal waveforms of the reproduced signal from recording media made of different materials.

There are magnetic recording/reproducing apparatuses for executing high density recording using barium ferrite readily magnetized perpendicular to the disk surface, as a recording medium such as a disk. Theoretically, the easier the vertical magnetization of the recording medium, the higher the recording density. In practice, however, barium ferrite tends to be magnetized in the synthesized direction of the perpendicular and the inplane magnetization components. Thus, when barium ferrite as the recording medium is used, a reproduced signal is obtained by synthesizing the perpendicular and the inplane magnetization components. Such a reproduced signal has an asymmetrical waveform as shown in FIG. 2, unlike a symmetrical waveform, or a Lorenz waveform, produced by the inplane magnetization component in, for example, cobalt-$\gamma$-hematite when used as the recording medium.

Figure 3:
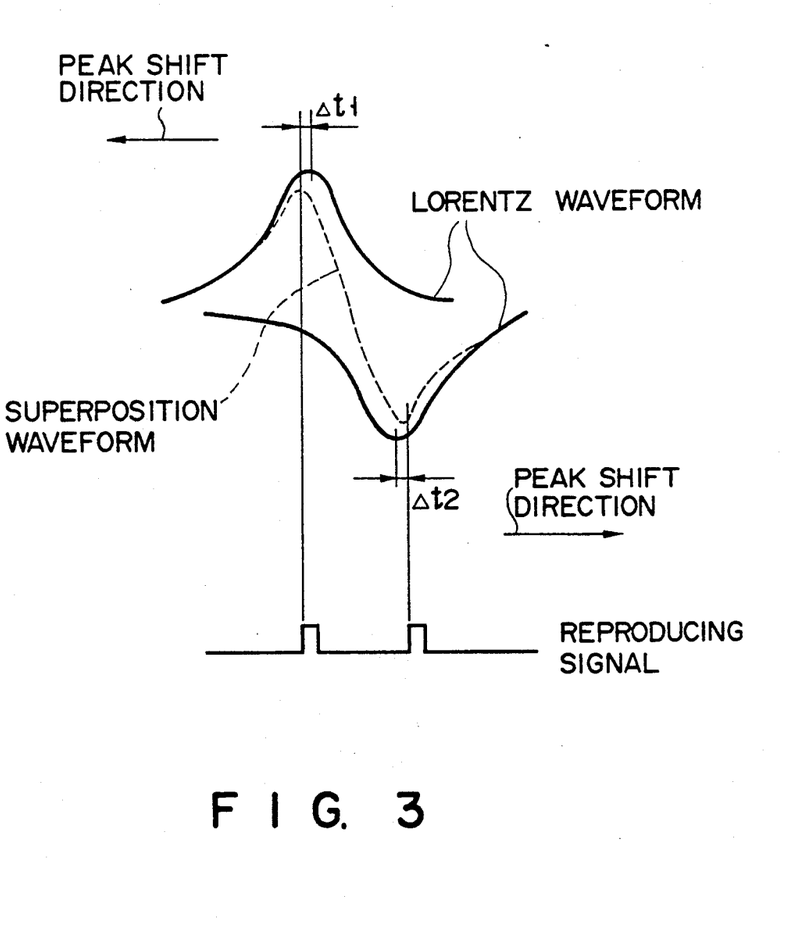
FIG. 3 is a diagram illustrating the peak shifts by different peak shift amounts for reproduced signals having asymmetrical waveforms.

When the pulse interval of the recording signal is narrow, for example, $2\mu$ sec, a peak shift occurs during data readout because the leading and trailing edges of the Lorenz waveform obtained by a single reproduced signal interfere with that of the adjacent reproduced signal, as shown in FIG. 3. In the Lorentz waveform, the peaks of adjacent waveforms are shifted in opposite directions by the same peak shift amount ($\Delta t_1 = \Delta t_2$) with respect to the center of the data window signal obtained from the "00" (H) data. In the above-mentioned asymmetrical waveform, however, the peaks are shifted by different amounts ($\Delta t_1 \neq \Delta t_2$). Therefore, although the sum of the peak shift amounts for adjacent asymmetrical waveforms is equal to that for Lorentz waveforms, the asymmetrical waveforms have smaller window margins.

Figure 4:
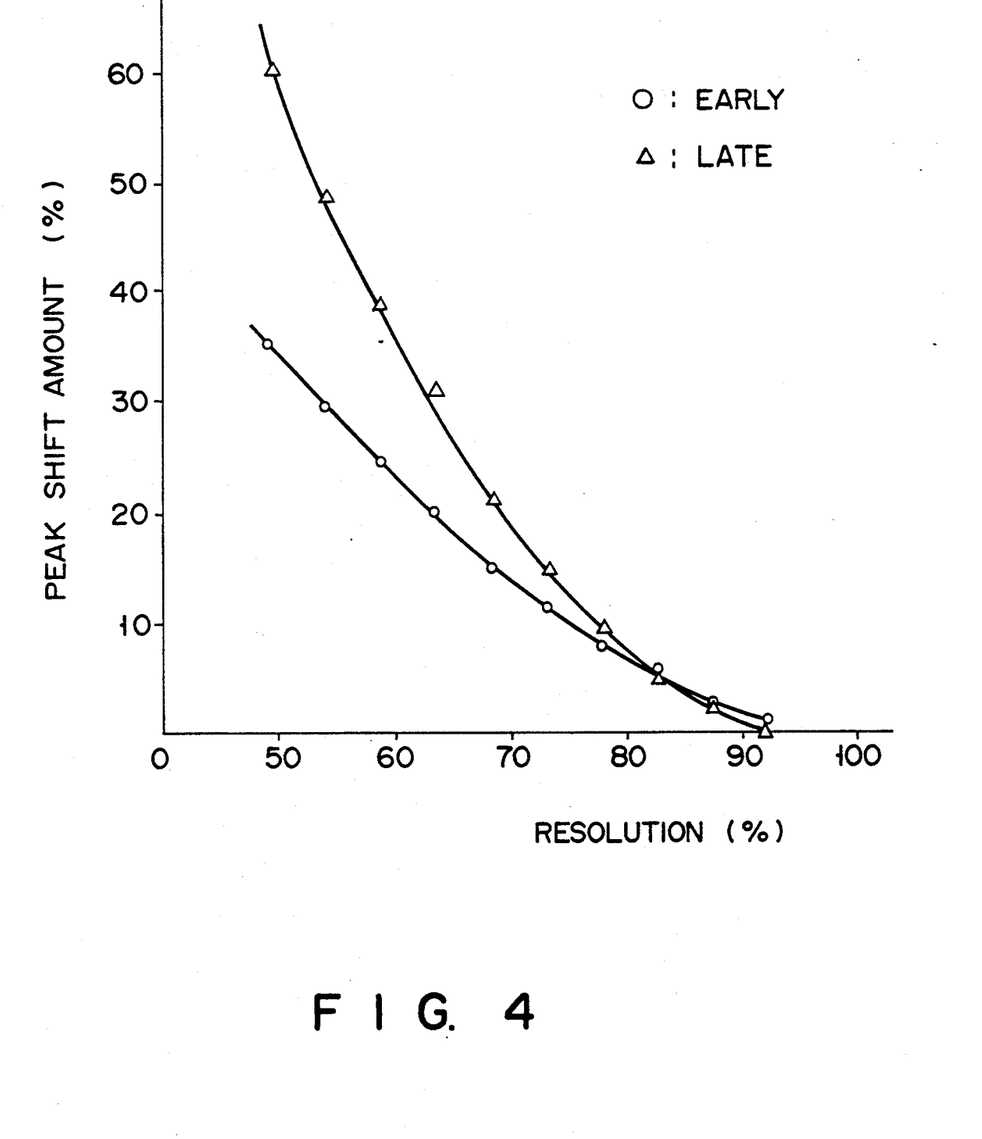
FIG. 4 represents a relationship between resolutions and peak shift amounts obtained by calculations.

FIG. 4 shows the calculated result of peak shift amounts for adjacent reproduced signals with respect to the data window signal obtained from the "00" (H) data, for a range of resolution related to the recording density of the recording medium. In these calculations, to approximate a reproduced signal in barium ferrite as the recording medium, the perpendicular vector ratio is set at 0.25. As previously noted, the peak shift amounts of adjacent reproduced signals having the asymmetrical waveforms are different. As shown in FIG. 4, for a resolution of 60%, the early peak shift amount is 24% of the window width of the data window signal, while the late peak shift amount is 38% of the window width of the data window signal. If each reproduced signal has an asymmetrical waveform, the peak shift amount is the average of the early and late peak shift amounts, namely 31%. Therefore, the window margin for an asymmetrical waveform is 7% less than that for a symmetrical waveform.

A decrease of the window margin occurs because of not only an asymmetrical waveform of reproduced signal, but also a thin film head as disclosed in "Time Domain Characterization of Thin Film Head/Media Systems," IEEE Trans. Mag., 1988, Vol. 24, No. 6, by Steve Brittenham.

Peak shift amounts by the peak shift due to the asymmetrical waveforms of reproduced signals change in accordance with the resolution as shown in FIG. 4. With magnetic recording/reproducing apparatuses such as floppy disk apparatuses, resolutions differ from each other for different recording mediums, so that by just providing the recording/reproducing circuit with a predetermined offset, the decrease of the window margin cannot be prevented.

Therefore, a magnetic recording and reproducing apparatus is required which can perform accurate data readout by preventing the decrease of the window margin.

SUMMARY OF THE INVENTION

It is an object of the present invention to provide a magnetic recording and reproducing apparatus.

According to one aspect of the present invention, there is provided a magnetic recording and reproducing apparatus comprising: a recording medium having a plurality of sync regions, each of the sync regions including a plurality of sync data in which peak shifts of different peak shift amounts occur; means for reading out the sync data from the sync region of the recording medium; and means for generating data window signals in accordance with the read out sync data.

According to another aspect of the present invention, there is provided a magnetic recording and reproducing apparatus comprising: a recording medium having a plurality of sync regions, each of the sync regions including a plurality of sync data in which peak shifts by different peak shift amounts occur, the sync data being recorded in the sync regions in accordance with a desired recording method; means for reading out the sync data from the sync region of the recording medium; and means for generating data window signals in accordance with the read out sync data, thereby phase-shifting the data window signals in accordance with the different peak shift amounts.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

An embodiment of the present invention will be explained, referring to the accompanying drawings.

Figure 5:
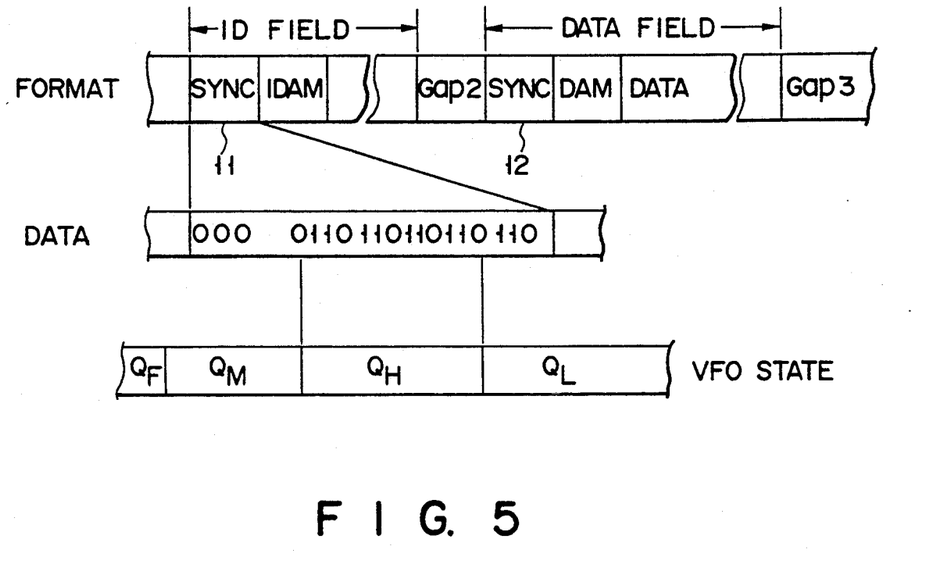
FIG. 5 shows the data format of the recording medium by the MFM recording method according to an embodiment of the present invention.

FIG. 5 shows a data format of the recording medium by the MFM (Modified Frequency Modulation) recording method, according to an embodiment of the present invention. As shown in FIG. 5, the heads of the ID field and data field for each sector include SYNC regions 11 and 12, respectively.

In the SYNC regions 11 and 12, "00" (H) data and "110" (B) data are recorded. (H) indicates the hexadecimal number, and (B) indicates the binary number. The desired number of "00" (H) data is continuously recorded from the head of the SYNC region, in the MFM recording method. "110" (B) data first used by the present invention, is recorded continuously in the remaining SYNC region, following the continuous "00" (H) data. Data window signals for an asymmetrical waveform of a reproduced signal obtained by use of barium ferrite as a recording medium or a thin film head or the like are produced by this "110" (B) data.

When reproduced signals with asymmetrical waveforms adjoin, peak shift amounts are different among these adjacent reproduced signals. In the embodiment, therefore, "110" (B) data is used to shift the center of the data window signal in accordance with the peak shift amount.

That is, data for shifting the data window signal by a desired peak shift amount according to the recording method is recorded in the SYNC region. With such data, the desired number of "0" (B) data is set before and after "11" (B) data, which corresponds to "110" (B) data in the MFM recording method, as described above.

The change of operation state for the data separator (also known as the VFO (Variable Frequency Oscillator) circuit) will be explained, referring to FIG. 6.

Figure 6:
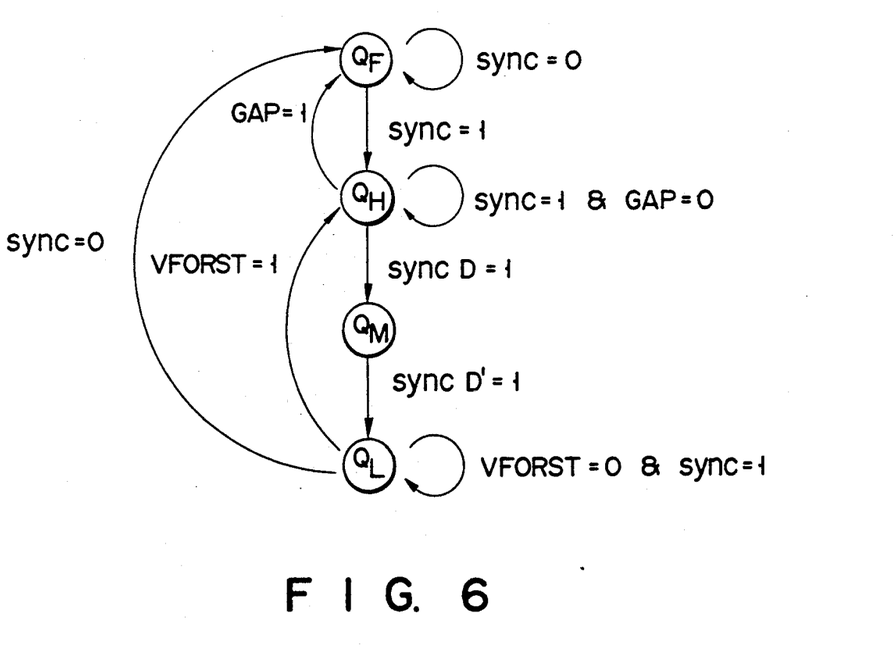
FIG. 6 illustrates the operation state of the VFO circuit in the embodiment.

In FIG. 6, QF represents a following state of the VFO circuit to the reference clock signal, QM represents a middle gain following state of the VFO circuit to the read data, QH represents a high gain following state of the VFO circuit to the read data, and QL represents a low gain following state of the VFO circuit to the read data. Also, GAP indicates the presence or absence of data outside "00" (H) data (when "00" (H) is detected, then GAP = 0) and sync indicates whether or not a read operation is executed (during the read operation, sync = 1). Further, sync D = 1 indicates that several bytes of "00" (H) data have been read continuously, whereas sync D' = 1 indicates that several bytes of data have been read after sync D = 1. VFORST indicates whether or not the VFO circuit is set at a high gain (if the VFO circuit is set at the high gain, then VFORST = 1).

Figure 7:
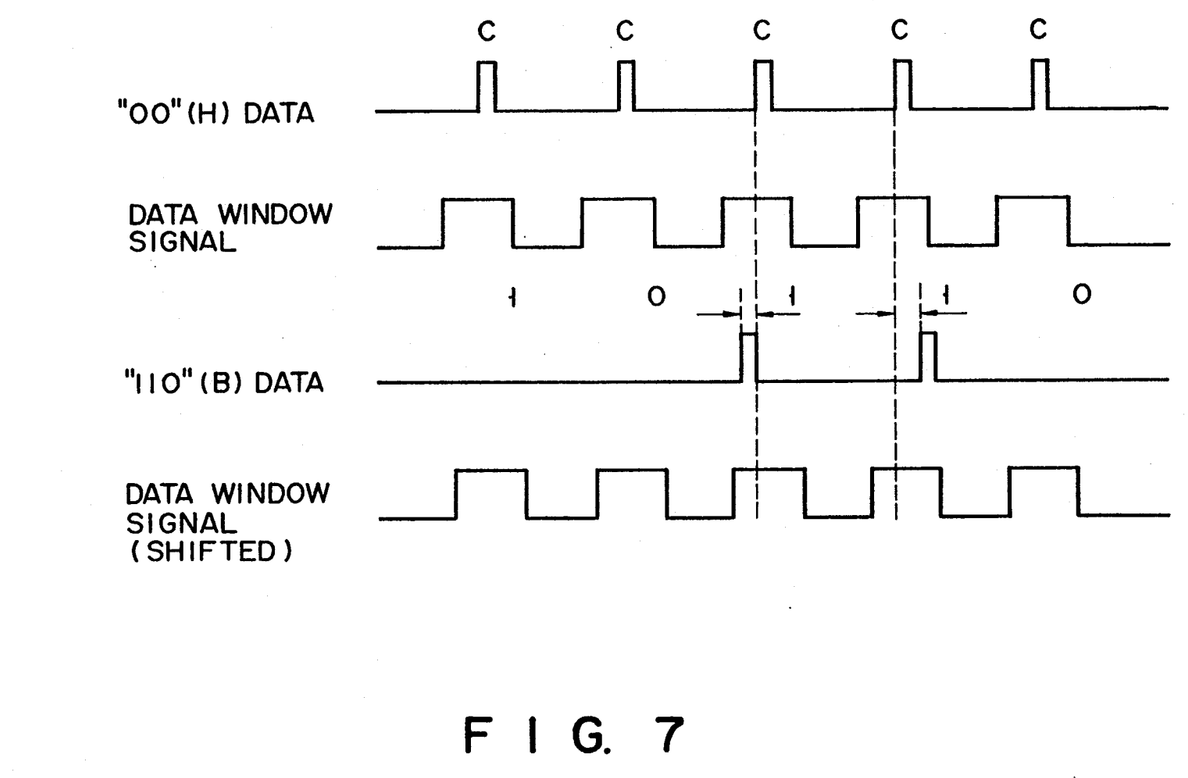
FIG. 7 shows the following of the data window signal in the embodiment.

When the read operation is executed (sync = 1), the high gain switching is performed for high speed following response and a high gain following for the read data is started. That is, the following state of the VFO circuit changes from QF to QH. In QH, the following for a frequency is mainly executed. The VFO circuit operates to follow to "00" (H) data, i.e., the reference clock signal, as shown in FIG. 7. In QH, when several bytes, for example, 4 bytes of "00" (H) data, is read, the middle gain switching is performed and the middle gain following is started. That is, the following state of the VFO circuit changes from QH to QM. In QM, a phase following for "110" (B) data recorded in the SYNC regions 11 and 12 is carried out, as shown in FIG. 7, and the center of the data window signal is shifted by the average of the different peak shift amounts by asymmetrical waveforms.

In QM, for example, when 4 bytes of "110" (B) data are read, low gain switching is performed. That is, the following state of the VFO circuit changes from QM to QL, and the VFO circuit is locked, thereby enabling a normal data read operation. In QL, a following is executed only for frequency fluctuations such as driving fluctuations in a motor. Accordingly, even if different peak shift amounts are obtained by "110" (B) data, the center of the data window signal is shifted by the average of the peak shift amounts, so that the peak shift amounts for reproduced signals with asymmetrical waveforms can be virtually reduced.

The construction and operation of the VFO circuit will be explained with reference to FIG. 8.

Figure 8:
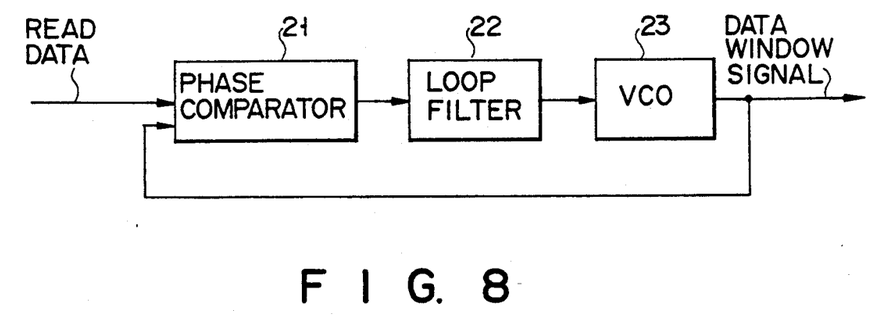
FIG. 8 is a block diagram showing the structure of the VFO circuit in the embodiment.

The VFO circuit of FIG. 8 comprises a phase comparator 21, a loop filter 22, and a voltage controlled oscillator (VCO) 23.

The phase comparator 21 compares the phase of data from the magnetic recording/reproducing apparatus (not shown) with that of the center of the data window signal generated by the VCO 23, and produces a signal to control the frequency of the VCO 23 in accordance with the comparison result. In response to the signal, a desired current is supplied by the constant current circuit (not shown).

Figure 9:
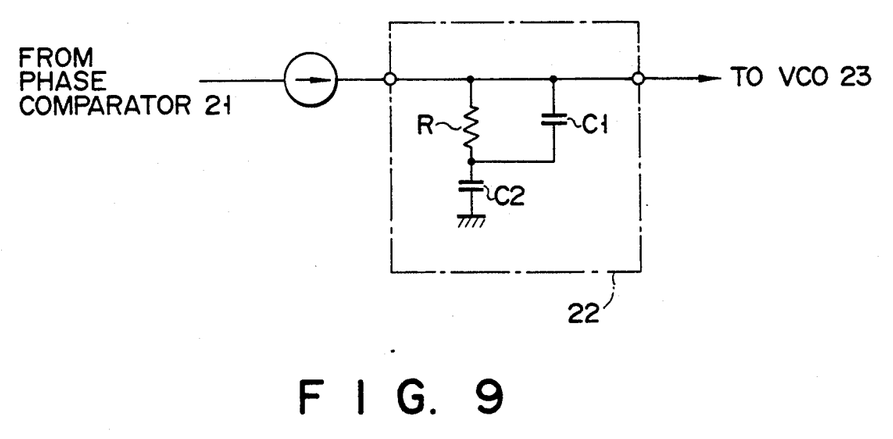
FIGS. 9 and 10 are diagrams of the loop filter of the VFO circuit and the frequency characteristics in the embodiment.
Figure 10:
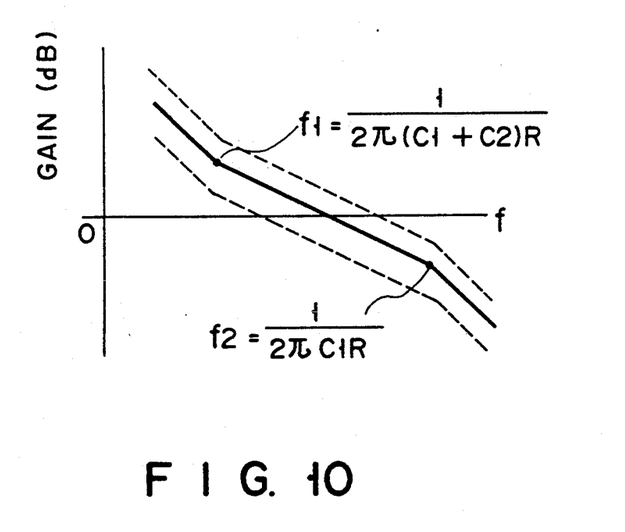

The loop filter 22 regulates the optimum voltage level for the VCO 23 in accordance with the desired current from the constant current circuit. The loop filter 22 comprises a resistor R and capacitors C1 and C2 as shown in FIG. 9. The VFO circuit has the frequency characteristics as shown in FIG. 10.

The VCO 23 oscillates at the frequency corresponding to the output voltage from the loop filter 22 to produce a data window signal.

Figure 11:
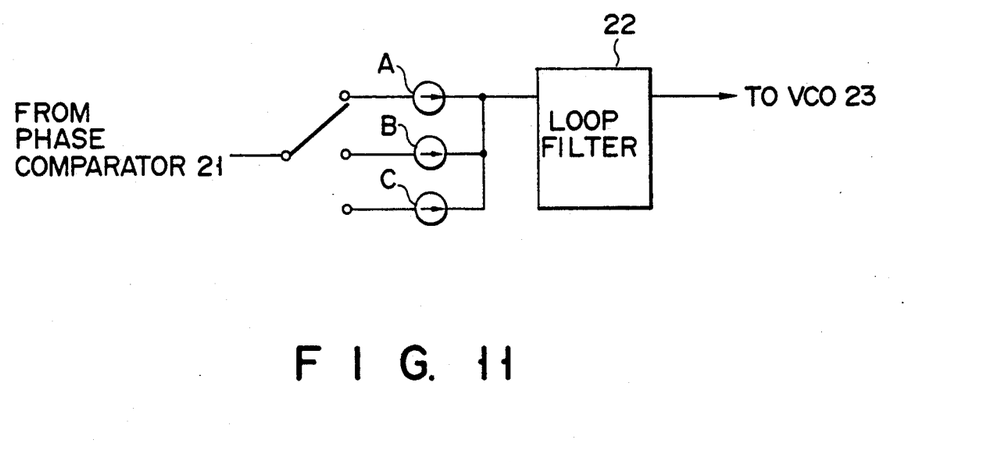
FIGS. 11 and 12 are diagrams of constant current circuits for changing the gain of the VFO circuit and the characteristics of each constant current circuit.
Figure 12:
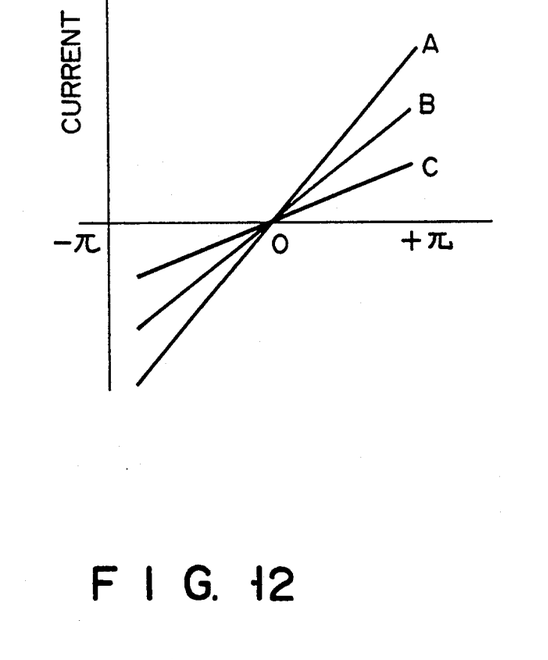

Gain switching of the VFO circuit, as previously noted, represents adjusting of the frequency range where the gain is positive. That is, with the frequency characteristics in FIG. 10, for example, it represents moving of the entire solid characteristic curve upward or downward, as shown in the dotted curve. This can be achieved by switching the constant current circuits A, B, or C of FIG. 11 (each circuit having the characteristics as shown in FIG. 12) in response to the signal output from the phase comparator 21, or by changing the value of the capacitor C2 in the loop filter 22 of FIG. 9.

Figure 13:
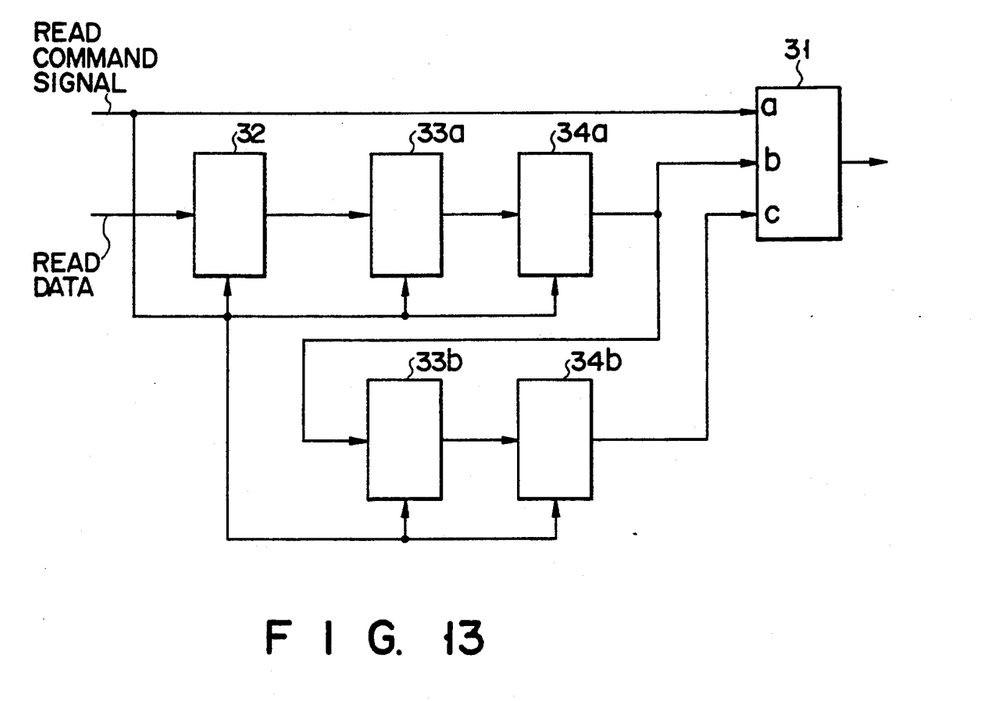
FIG. 13 is a block diagram of the gain changing circuit for the VFO circuit.

FIG. 13 is a block diagram of the gain changing circuit in the VFO circuit. The gain changing circuit comprises a gain selector 31, a "00" (H) data detector 32, timers 33a and 33b, and latch circuits 34a and 34b.

Figure 14:
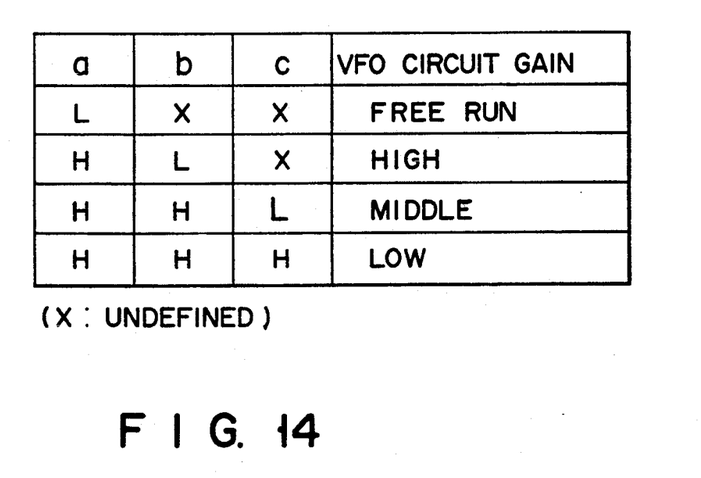
FIG. 14 shows the input/output operation table for the gain selector of the gain changing circuit in FIG. 13.

When a high level read command signal is supplied from the host computer (not shown), as shown in the input/output operation table of FIG. 14, the VFO circuit is switched to a high gain in accordance with the read command signal (a first high level signal) input to the terminal a of the gain selector 31, thereby starting a high gain following for read data. The first high level signal is also used to enable the "00" (H) data detector 32, timers 33a and 33b, and latch circuits 34a and 34b.

When "00" (H) data recorded in the SYNC regions 11 and 12 is detected by the "00" (H) data detector 32, the timer 33a starts to count. When "00" (H) data is detected continuously for a desired period of time, then a pulse signal is output from the timer 33a, and is latched by the latch circuit 34a. As a result, in response to the first high level signal and a second high level signal supplied from the latch circuit 34a to the terminal b of the gain selector 31, the VFO circuit is switched to a middle gain, thereby starting a middle gain following for read data.

The timer 33b starts to count in response to the second high level signal from the latch circuit 34a. After a desired period of time elapses, a pulse signal is output from the timer 33b, and is latched by the latch circuit 34b. As a result, in response to the first and second high level signals and a third high level signal supplied from the latch circuit 34b to the terminal c of the gain selector 31, the VFO circuit is switched to a low gain, enabling a normal data read operation.

When all required data have been read, the output of the read command signal is stopped, thereby disabling and resetting the gain selector 31, "00" (H) data detector 32, timers 33a and 33b, and latch circuits 34a and 34b.

As previously described, according to the present invention, the center of the data window signal produced by the VFO circuit can be shifted automatically, depending on the data recorded in the SYNC regions in the data format for the recording medium. Therefore, a decrease in the window margin can be prevented even for a reproduced signal of an asymmetrical waveform, thereby executing an accurate data readout.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A magnetic recording and reproducing apparatus, comprising:
    a recording medium having a plurality of sync regions, each one of the sync regions including a plurality of sync data, each of the plurality of sync data in a sync region indicating a different peak shift;
    means for reading out the sync data from one of the sync regions of the recording medium; and
    means for generating data window signals in accordance with the read out sync data.

2. The apparatus according to claim 1, wherein the sync data is recorded in the sync regions of the recording medium in accordance with a desired recording method.

3. The apparatus according to claim 2, wherein the sync data includes "110" binary data in an MFM (modified frequency modulation) recording method.

4. The apparatus according to claim 1, wherein the generated data window signals are phase-shifted in accordance with an average of different peak amounts of peak shifts in the adjacent sync data.

5. A magnetic recording and reproducing apparatus, comprising:
    a recording medium having a plurality of sync regions, each one of the sync regions including a plurality of sync data, each of the plurality of sync data indicating a different peak shift, the sync data being recorded in the sync regions in accordance with a desired recording method;
    means for reading out the sync data from the sync region of the recording medium; and
    means for generating data window signals in accordance with the read out sync data.

6. The apparatus according to claim 5, wherein the generated data window signal is phase-shifted in accordance with an average of different peak amounts of the peak shifts in adjacent sync data.

7. The apparatus according to claim 5, wherein the sync data includes "110" binary data in an MFM (modified frequency modulation) recording method.

* * * * *